3,379,641
Patented Apr. 23, 1968

3,379,641
LOW PRESSURE REFORMING WITH A PLATINUM, HALOGEN, ALUMINA, SULFUR AND IRON CATALYST
John C. Hayes, Palatine, Ill., assignor to Universal Oil Products Company, Des Plaines, Ill., a corporation of Delaware
No Drawing. Filed Oct. 3, 1966, Ser. No. 583,963
9 Claims. (Cl. 208—139)

ABSTRACT OF THE DISCLOSURE

Low pressure reforming of a gasoline charge stock by contacting the charge stock in admixture with hydrogen and 1–25 p.p.m. by weight of an alkyl halide, at reforming conditions including a pressure of 50–200 p.s.i.g., with a sulfided Pt-Fe-halogen-$Al_2O_3$ catalyst, the iron content of the catalyst being 100–5000 p.p.m. and the iron being uniformly distributed throughout the catalytic composite.

---

The present invention relates to a process for the catalytic conversion of hydrocarbons. More specifically, the present invention pertains to a process for reforming of hydrocarbon charge stock which utilizes a low pressure operating condition in conjunction with a five component catalyst and a feed additive, in order to achieve a marked improvement in yield-octane characteristics. In general, the conception of the present invention stems from a recognition that the stability problem that has plagued low pressure reforming operations in the past can be overcome, at least in part, by incorporating controlled amounts of iron in a catalytic composite of a platinum group metal, alumina, a halogen, and sulfur and by operating at high equilibrium levels of halogen in the catalyst as will be hereinafter explained in detail.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, the components of gasolines and naphthas that have the highest octane-improving potential. For paraffins, the upgrading reactions are: isomerization, dehydrogenation to olefins, dehydrocyclization to aromatics, and hydrocracking to lower molecular weight paraffins. Of these, the dehydrocyclization reaction shows the maximum gain in octane number and is, consequently, preferred. For naphthenes, the principal upgrading reactions involve dehydrogenation and ring isomerization to aromatics; but the improvement in octane number is not as dramatic as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a metallic dehydrogenation component and an acid-acting hydrocracking component.

It is not, however, to be assumed that the achievement and control of this optimum mix of upgrading reactions is without its problem areas—particularly in the area of process stability. These, as is true with any complex set of reaction mechanisms, are injected into the picture by the ever present side phenomena, such as carbonaceous deposit formation, yield losses, activity decline, etc., which in turn are produced by a myriad of factors that color and complicate the actual operations of such a reforming process. Foremost among these complicating factors are those associated with undesired side reactions. Examples of these side reactions are: demethylation of hydrocarbons to produce methane, ring opening of naphthenes to give straight chain hydrocarbons, excessive hydrocracking to yield light gases (i.e. $C_1$ to $C_3$), condensation of aromatics and other components to form carbonaceous deposits on the catalyst, acid-catalyzed polymerization of olefins and other highly reactive components to yield high molecular weight reactants that can undergo further dehydrogenation and thus contribute to the carbonaceous deposits on the catalyst, etc.

Accordingly, a successful reforming operation minimizes the effects of these side reactions by judicious selection of the catalytic environment and process variables for the particular charge stock of interest. But, adding an additional dimension of complexity to the solution of this problem is the interdependence of the set of desired reactions and the set of undesired reactions such that selection of the proper conditions to minimize one effect may have, and indeed most likely does, a marked effect on the set of desired reactions.

To illustrate this principle, consider the demethylation reaction. This is believed to be catalyzed by the metallic dehydrogenation component of the catalyst, which is also of prime importance in, for example, the dehydrogenation-of-naphthenes-upgrading reaction. Therefore, a balance must be achieved between the desired effect and the undesired effect or, alternatively, a way must be found to inhibit the undesired reaction. The process of the present invention elects the latter route and provides a catalytic environment that inhibits demethylation through the action of sulfur on the hydrogenation sites of the catalyst.

Still another example of this interdependence is the hydrocracking reaction which is defined as the interaction of a hydrocarbon with hydrogen resulting in the cleavage of a carbon-to-carbon bond. As previously indicated, some hydrocracking is desired since it produces lower boiling hydrocarbons which have higher octane numbers and lower densities than the parent hydrocarbons; but hydrocracking of lower boiling constituents (i.e. $C_6$ to $C_8$) is not desired since at least one of the products is a butane or lighter hydrocarbon which have marginal utility. It is this cracking of lower boiling constituents that is termed "excessive hydrocracking" and is to be avoided. The process of the present invention controls the extent and kind of hydrocracking by carefully controlling the acid-acting components present in the catalytic environment and by a controlled application of the well-known principle of mass action. The application of this principle follows from the fact that the hydrocracking reaction consumes hydrogen and therefore by adjusting the concentration (i.e. moles per unit volume) of hydrogen present in the reaction environment this reaction can be controlled. The present invention achieves this control by operating at hydrogen partial pressures that were, in the prior art, thought to be nonfeasible because of adverse effects of low pressure on the previously mentioned undesired side reactions as will be hereinafter explained.

At this point it is to be carefully noted that low partial pressures of hydrogen are also greatly desired because the two main upgrading reactions mentioned previously—dehydrocyclization of paraffins and dehydrogenation of naphthenes—are net producers of hydrogen and, as such, are favored by lower partial pressures of hydrogen.

The principal barrier to low pressure operation in the past has been the effect of low pressure on the previously mentioned catalyst-fouling reactions of condensation and polymerization which are believed to be the principal reactions involved in carbon formation on the catalyst. It is thought that this carbon formation involves in part certain aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of an acid catalyst tend to undergo condensation and polymerization type reactions via a reaction mechanism that is believed to involve the carbonium ions resulting from the cracking and dehydrogenation reactions, and to settle on the catalyst and undergo further dehydrogenation until carbonaceous deposits are formed. Low pressures tend to favor these catalyst fouling reactions, as is shown in an example appended to this specification because, I believe, of the increase in the probability of collisions between a carbonium ion and a hydrocarbon molecule which would yield a new higher molecular weight carbonium ion. This increase in probability is brought about by the relative scarcity of hydrogen atoms, due to the low partial pressure of hydrogen, which ordinarily would tend to quench the reaction by eliminating the carbonium ion. In addition, low partial pressure of hydrogen, since it suppresses hydrocracking, tends to allow the precursors to these undesired side reactions to collect on the catalyst, whereas ordinarily the high cracking activity of the catalyst would tend to keep the catalyst relatively free of these carbonaceous deposit precursors. In any event, this increase in fouling at low pressures results in the decline in catalyst aromatization activity and, if a product of constant quality is desired, it is necessary to compensate for this deactivation. Usually the most direct and inexpensive method for compensating involves increasing the reaction temperature. This in turn, however, leads eventually to the promotion of hydrocracking to a greater extent than dehydrogenation and dehydrocyclization reactions. Hence, greater losses to light gases are encountered, hydrogen consumption goes up, and yield goes down. Furthermore, the rate of catalyst fouling increases exponentially as temperature is increased. It is apparent, therefore, that raising the reaction temperature is not a very selective manner to compensate for catalyst deactivation.

I have now discovered that by judicious selection of catalytic components and environment, the reactions associated with reforming catalyst fouling can be inhibited. Hence, operations at pressures substantially less than that presently commercially feasible are not only possible but highly desirable. My invention, as will be hereinafter explained in detail, involves the incorporation of a uniform distribution of iron in the catalytic composite, which is utlized in the practice of the present invention, coupled with the introduction of controlled amounts of a halogen-containing compound to the reforming zone during processing in order to sustain higher equilibrium levels of halogen in the catalyst. These provisions quite remarkably inhibit the formation of carbonaceous deposits and, consequently, allow the achievement of a stable operation at low partial pressure of hydrogen.

It is to be emphasized at this point, that it is well-known that a reduction in hydrogen partial pressure would tend to promote the desired upgrading reactions; but, in the art, this had always been found to be commercially impractical and inexpedient because, as previously explained, of the increased rate of carbonaceous deposit formation on the catalyst, with the attendant drop in product quality and the consequential requirement for increased temperature to compensate for this. Therefore, it is not the mere recognition of the desirability of operating at low hydrogen pressures that constitutes the essence of my invention; but, more significantly, the achievement of stable operation under these conditions. And it is this stability, measured in terms of reaction temperature stability and $C_5+$ yield stability, that is an essential feature of my invention as will be demonstrated in an example appended to this discussion.

It is, accordingly, an object of the present invention to provide a means for inhibiting the formation of carbonaceous deposits on a reforming catalyst during a low pressure reforming operation. A corollary objective is to provide a highly active, stable, and selective reforming process that provides high yield-octane number relationships at low pressure. Another objective is to provide a stable process for the production of aromatics from naphthenes and/or paraffins at relatively low pressures. Still another objective is to provide a low pressure reforming process that can operate without regeneration for a significant period of time which is comparable to those that are achieved for high pressure operation. A further object is to provide a successful low pressure reforming operation that can be built essentially without expensive regeneration facilities.

In one embodiment, the present invention relates to a process for reforming a hydrocarbon charge stock which comprises contacting said charge stock, hydrogen, and from about 1 p.p.m. to about 25 p.p.m. of a halogen-containing compound in a reforming zone, including at reforming conditions, a pressure of from about 50 p.s.i.g. to about 200 p.s.i.g., with a catalytic composite comprising an alumina component, a halogen component, a platinum group component, a sulfur component, and an iron component.

Other embodiments of the present invention relate to particularly preferred catalyst manufacturing and treatment procedures, concentration of catalytic components, process conditions, and mechanisms for effecting the process of the present invention as will be hereinafter discussed.

It is not completely understood why the present invention eliminates the severe stability problem that has heretofore plagued low pressure reforming operation. Nevertheless, without the intention of limiting my invention thereby, I believe that the stability improvement is a product of a number of interdependent factors. First, I have found that a uniform distribution of iron in the catalyst will in combination with the sulfur component tend to improve stability—particularly $C_5+$ yield stability—by at least partially inhibiting the previously mentioned catalyst-fouling reactions of condensation and polymerization. However, at low pressure this iron effect alone is not adequate to compensate for the severe deactivating consequences of operating at low partial pressures of hydrogen. And this inability is evidenced by a substantial temperature instability which accompanies low pressure operation with an iron-containing catalyst. Consequently, it is necessary to add a means for achieving temperature stability in order to attain the desired stability. I have now found that the operation of the process at higher equilibrium levels of halogen in the catalytic composite will effect this temperature stability. And quite surprisingly, I have found that the increase in the halogen content of the catalyst does not induce excessive loss to light gases via increased hydrocracking as would ordinarily be expected. Furthermore, I believe that this surprising result is due to the combination of iron and the halogen which together tend to promote selective hydrocracking to products boiling above $C_4$ hydrocarbons such that the increase in the acid-acting component (i.e. the halogen) does not result in a sharp increase in $C_5+$ yield instability. Moreover, this increase in selective hydrocracking results in temperature stability since it tends to selectively crack the carbonaceous deposit precursors which, as previously explained, are believed to be the chief deactivating influences. Accordingly, the catalyst is maintained relatively free of these precursors and activity-stability is enhanced.

Before considering in detail the various ramifications of the present invention, it is convenient to define several of the conventions, terms, and phrases used in the specification and in the appended claims. In those instances where temperatures are associated with boiling ranges and boiling points, it is understood that they have reference to those which are obtained through the use of Standard ASTM distillation methods. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and and end boiling point within the range of about 350° F. to about 425° F. The phrase "hydrocarbon charge stock" is intended to refer to a portion of a petroleum crude oil, a mixture of hydrocarbons, a coal tar distillate, a shale oil, etc., that boils within a given temperature range. The term "selectivity" when it is applied to a reforming operation refers to the ability of the process to promote favored octane-improving reactions and to inhibit undesired reactions. The term "activity" when it is applied to reforming operation refers to the relative ability of the process to produce at specified process conditions a product of the required quality as measured by octane number. The term "stability" when it is applied to the reforming process refers to the rate of change of the operating parameters associated with the process; for instance, a common measure of stability is the rate of change of reactor temperature that is required to maintain a given quality in output product—the smaller slope implying the more stable process. The phrase "platinum group component" embraces all the members of Group VIII of the Periodic Table having an atomic weight greater than 100 as well as compounds and mixtures of any of these. The "liquid hourly space velocity" is defined to be the equivalent liquid volume of the charge to the reactor per hour divided by the volume of catalyst disposed within the reaction zone. The elements of interest to the present invention may exist within the final catalytic composite in any form—combined or uncombined; nevertheless, they are referred to within the specification and claims as if they were present in the elemental state—for example, the term "iron" is used herein to denote both iron in the elemental state and iron in any combined form such as iron sulfide. In addition, the concentration of these elements in the catalytic composite are reported herein on an elemental basis even though they may exist within the composite in some combined form. Likewise, the concentration of halogen-containing compounds reported herein are calculated as weight parts of charge stock (p.p.m.) and given on the basis of the elemental halogen even though the halogen may be present as a compound.

The hydrocarbon stocks that can be converted in accordance with the process of the present invention comprise hydrocarbon fractions containing naphthenes and paraffins. The preferred charge stocks are those consisting essentially of naphthenes and paraffins although in some cases aromatics and/or olefins may also be present. This preferred class includes straight run gasolines, natural gasolines, and the like. On the other hand, it is frequently advantageous to charge thermally or catalytically cracked gasolines or higher boiling fractions thereof to the reforming process of the present invention. Mixtures of straight run and cracked gasoline can also be used. The gasoline charge stock may be a full boiling range gasoline or may be a selected fraction thereof which usually will be a higher boiling fraction commonly referred to as a heavy naphtha. It is also possible to charge to the process of the present invention pure hydrocarbons or mixtures of hydrocarbons, usually paraffins or naphthenes, which it is desired to convert to aromatics.

As hereinabove set forth, the present invention encompasses utilization of a catalytic composite which contains alumina. In the present specification and appended claims, the term "alumina" is employed to mean porous aluminum oxide in all states of oxidation and in all states of hydration, as well as aluminum hydroxide. The alumina may be activated prior to use by one or more treatments including drying, calcining, steaming, etc.

The alumina may be prepared by adding a suitable alkaline reagent such as ammonium hydroxide to a salt of aluminum such as aluminum chloride, aluminum nitrate, etc., in an amount to form aluminum hydroxide which, upon drying, and calcination is converted to alumina. Alumina may also be prepared by the reaction of sodium aluminate with a suitable acidic reagent to cause precipitation thereof with the resultant formation of sodium aluminate with a suitable acidic reagent to cause precipitation thereof with the resultant formation of aluminum hydroxide gel. Synthetic aluminas may also be prepared by the reaction of metallic aluminum with hydrochloric acid, acetic acid, etc., in order to form a hydrosol which can be gelled with a suitable precipitating agent, such as ammonium hydroxide, followed by drying and calcination. The alumina may be formed into any desired shape such as spheres, pills, extrudates, powder, granules, etc. A preferred form of alumina is the sphere, and alumina spheres may be continuously manufactured, as detailed in U.S. Patent No. 2,620,314 by passing droplets of an alumina hydrosol into an oil bath, by means of a nozzle or rotating disk, maintained at an elevated temperature, the droplets being retained in said oil bath until they set to form hydrogel spheroids. The spheres are continuously withdrawn from the oil bath and immediately thereafter subjected to specific aging and drying treatments, in an ammoniacal solution, to impart certain desired physical characteristics thereto. Following drying the spheres are preferably subjected to a specific calcination procedure. The dried alumina is usually calcined initially at a temperature of from about 850° F. to about 1050° F. for a period of at least about one hour, and thereafter at an elevated temperature of about 1100° F. to about 1400° F. and for a time sufficient to decrease the volatile matter content of the calcined alumina to a level below about 2.0% by weight.

It is a feature of the present invention that the alumina be substantially free of foreign contaminants—particularly iron oxide—prior to its use in the process of the present invention. This requirement is generated by the necessity of carefully controlling the concentration and especially the distribution of iron in the resultant catalytic composite. While it is feasible to adjust the contaminant iron concentration in order to yield the desired iron concentration, such a procedure is not practical because of the analytic control difficulties associated with obtaining the desired concentration of iron in the required uniform distribution and because it has been found that the process of removing the contaminate iron also serves to remove other contaminants. Consequently, it is necessary that the alumina component contain less than 20 p.p.m. by weight of contaminating iron and preferably less than 10 p.p.m. In general, this purity requirement is achieved by use of high purity reactants or by magnetic purification during alumina synthesis such as by use of magnetic dross collectors.

The iron component of the catalyst associated with the present invention can be composited with the alumina component in any suitable manner designed to achieve a uniform distribution of iron throughout the alumina. It is generally preferred to commingle an iron-containing compound with the aluminum salt or the alumina hydrosol prior to the formation of the alumina particles in order to insure a uniform distribution of the iron throughout the alumina carrier material. Any suitable iron-containing compound can be utilized; but it is generally preferable to utilize an iron salt such as: iron chloride, iron bromide, iron acetate, iron fluoride, iron formate, iron iodide, iron nitrate, etc. Acceptable results can also be obtained by impregnating the alumina carrier material with a solution or colloidal solution, or suspensions of the previously mentioned iron salts since the alumina is readily uniformly penetrated by these solutions. In cases where the iron-containing compound is not soluble in water at the temperature used, other suitable solvents can be utilized such as alcohols, ethers, etc.

I have now found that the method used for incorporating the iron is not critical, provided there is a uniform distribution of the iron throughout the resultant iron-containing composite and there is careful control of the concentration of the iron. Also, I have found that improved stability is exhibited by the catalyst when the iron is present in an amount of from 100 p.p.m. to about 5000 p.p.m. based on the weight of the alumina carrier material. At concentration levels greater than this, the increased stability is offset by a tendency toward excessive hydrocracking.

As previously mentioned, the process of the present invention utilizes a catalyst containing a platinum group component. Although the process of the present invention is specifically directed to the use of a catalytic composite containing platinum, it is intended to include other platinum-group metals such as palladium, rhodium, ruthenium, osmium and iridium. Generally, the amount of the platinum group component composited with the catalyst is small compared to the quantities of the other components combined therewith. For example, platinum and/or palladium, or other metals from the platinum group will generally comprise from about 0.01% to about 3.0% by weight of the total catalyst calculated on an elemental basis, and usually from about 0.1% to about 2.0% by weight.

The platinum group component may be incorporated in the catalytic composite in any suitable manner; for example, by impregnation or by coprecipitation with an appropriate platinum group compound, such as chloroplatinic acid, platinum cyanide, platinum hydroxide, palladium chloride, etc. Platinum is the preferred component; and it is generally added to the carrier material by commingling the latter with an aqueous solution of chloroplatinic acid or other water soluble compounds of platinum group metals.

The catalyst for the process of the present invention also contains combined halogen. This combined halogen may be either fluorine, chlorine, iodine, bromine, or mixtures thereof. Of these chlorine is preferred because of its superior compositing characteristics and its ready availability. The halogen may be added to the calcined carrier material in any suitable manner, and either before, during or after the addition of the catalytically active metallic components. The halogen may be added as an aqueous solution of an acid, such as hydrogen fluoride, hydrogen chloride, hydrogen bromide, etc. Another satisfactory source of halogen is the volatile salts, such as ammonium fluoride, ammonium chloride, etc. At least a portion of the halogen may be composited with the alumina during the impregnation of the latter with platinum group component, for example, through the utilization of a mixture of chloroplatinic acid and hydrochloric acid. In any event, the halogen will be composited in such a manner as to result in a final composite that contains about 0.4% to about 4.0%, and preferably about 0.8% to about 2.0% by weight of halogen calculated on an elemental basis.

After the additional components have been incorporated in the alumina carrier, the resultant composite is typically dried at a temperature of about 200° F. for the purpose of removing the excess water or other solvent remaining from the impregnation procedure. Thereafter, the composite is oxidized, or calcined, initially at a temperature within the range of from about 400° F. to about 600° F. for a period of time of one hour or more. Then the calcination temperature is increased to a level of about 900° F. to about 1200° F. for an additional period of at least one hour. The resultant oxidized composite is then preferably subjected to treatment procedure involving a reduction step and a sulfiding step.

The reduction step is effected by contacting the oxidized catalytic composite with a stream of hydrogen that is oxygen-free and sulfur-free. This hydrogen can be once-through pure hydrogen or it can be recycle hydrogen that has been suitably scrubbed down to low level of water by passing the effluent from the reduction zone over high surface area sodium, aluminosilicates, alumina, silica gel, ion-exchange resins, etc. The temperature employed in this step is within the range of about 900° F. to about 1100° F. and preferably about 950° F. to about 1050° F. This reduction can be conducted at any suitable pressure, but it is generally more convenient to perform it at atmospheric. The time of contact of the hydrogen with the catalytic composite varies as a function of the concentration of oxygen combined with the platinum metal; but, in general, it is at least one hour.

Following the reduction step the resultant reduced catalytic composite is subjected to a sulfiding step. This consists in the preferred embodiment of contacting the reduced composite with an oxygen-free gas mixture composed of hydrogen and hydrogen sulfide. It is possible to employ other gases than hydrogen as the diluent for the hydrogen, such as nitrogen or other inert gases; but I find that best results are obtained when oxygen-free hydrogen is used. In addition, it is conceivable that a reducible sulfur-containing compound, such as: a mercaptan, a sulfide, a disulfide, a heterocyclic sulfur compound, etc., could be utilized to furnish the necessary hydrogen sulfide; but for reasons of convenience it is generally preferred to directly utilize hydrogen sulfide. In any event, the concentration of hydrogen sulfide in the diluent must be carefully controlled to insure the deposition of the requisite amount of sulfur and the uniform distribution of the sulfur throughout the catalyst bed. This concentration, accordingly, must be in the range of about 0.1 to about 2 moles of hydrogen sulfide per 100 moles of hydrogen.

The sulfiding operation can be conducted at any suitable temperature but, in general, it is preferred to conduct it at substantially the same temperature that the reduction operation is performed at—namely, about 900° F. to about 1100° F. Likewise, any suitable pressure can be employed in the execution of this step; but, generally, atmospheric pressure is preferred. Additionally, the time of contact and the sulfiding temperature of the sulfiding gas is adjusted in order to composite from about 0.05% to about 0.50% by weight of sulfur with the reduced catalytic composite.

As hereinbefore indicated, an essential feature of the present invention is the maintenance of a high equilibrium halogen level on the catalyst. Since the halogen is constantly being removed from the catalyst during processing, it is necessary to add halogen to the reforming zone in order to establish and maintain the desired concentration in the catalyst. This can be most easily accomplished by adding a halogen-containing compound to the feed to the reforming zone—either to the hydrocarbon charge stock or to the hydrogen or to both. Alternatively, the halogen-containing compound can be independently introduced into the reforming zone. Moreover, it can be added continuously or intermittently.

Suitable halogen-containing compounds are those that enter into an association with the alumina (n.b. the exact form of the association is not known but it is believed to be a chemical combination or loose complex) or that undergo transformation at reforming conditions to a form that is capable of associating with the alumina. Examples of these halogen-containing compounds include: chlorine, hydrogen chloride, ammonium chloride, monochloro acetic acid, trichloro acetic acid, carbon tetrachloride, trichloromethane, tetra - chlorethylene, methylene, methylene chloride, ethylene chloride, hydrogen fluoride, dichlorodifluoromethane, hydrogen bromide, bromine, and the like.

Particularly preferred compounds are the alkyl halides such as: tertiary-butyl chloride, tertiary-butyl fluoride, n-hexyl chloride, n-hexyl fluoride, n-propyl chloride, and the like. It is to be noted that all of the aforementioned halogen-containing compounds are not necessarily equivalent as to their effect on the catalyst; but they all serve to maintain the halogen concentration on the catalyst.

Likewise, it is to be noted that the halogen that is introduced into the reforming zone may be the same as the one originally in the catalyst or it may be different.

The amount of the halogen containing compound to be added to the reforming zone is a function of the desired equilibrium level of halogen on the catalyst, of the nature of the charge stock being processed, of the amount of water in the catalytic environment, and, of the nature of the halogen-containing compound. At first glance this may seem like quite a complex relationship, but in actual practice I have found that if the water level in the charge stock is kept to reasonably low levels—less than 20 p.p.m.—then for the charge stocks of concern to the present invention, the amount of halogen-containing compound necessary is about 1 p.p.m. to about 25 p.p.m. by weight of the charge stock. The exact value within this broad range being most easily determined empirically for the particular charge stock of interest.

An additional reactant for the process of the present invention is hydrogen. This may be hydrogen introduced from a extraneous source; but preferably it is obtained from the effluent from the reforming zone. Since the process of the present invention operates at low partial pressures of hydrogen and since this condition favors the hydrogen-producing reactions, ample hydrogen for recycle is typically produced in the reforming zone.

As indicated previously, a singular feature of the present invention is the capability to operate in a stable fashion at low pressure. In the past it has been the practice to operate at high pressure primarily to provide sufficient hydrogen to saturate hydrocarbon fragments generated during the reforming process and to prevent excessive carbon deposition on the catalyst with the attendant decline is the catalyst's activity for the upgrading reactions of interest. I have now found that a stable operation is achieved using the process of the present invention at pressures in the range of about 50 to about 200 p.s.i.g. and preferably about 75 to about 175 p.s.i.g. The exact selection of the operating pressure within these ranges is made primarily as a function of the characteristics of the particular charge stock being subject to the process of the present invention; for instance, I have achieved a stable operation for a light Kuwait naphtha at 100 p.s.i.g. as will be shown in the example.

The temperature required in the reforming zone of the present invention is generally lower than that required for a similar high pressure operation. This significant and desirable feature of the present invention is a consequence of the inherent selectivity of the low pressure operation of the octane upgrading reactions as previously explained. In the past, when high-octane was required, it was the practice to run at higher temperatures in order to produce more hydrocracking of paraffins and thus concentrate the available aromatics in the product stream. The present process requires a temperature in the range of about 800° F. to about 1100° F. and preferably about 850° F. to about 1050° F.

The process of the present invention is operated at a liquid hourly space velocity in the range of about 0.5 to about 15.0 and preferably in the range of about 1.0 to about 5.0. Furthermore, the amount of hydrogen-rich gas charged along with the hydrocarbon stream is from about 0.5 to about 20 mols of hydrogen per mol of hydrocarbon, and preferably from about 4 to about 12 mols of hydrogen per mol of hydrocarbon.

An extraordinary feature of the process of the present invention is the infrequency with which the catalyst must be regenerated. Previously, low pressure operations have required extensive regenerating facilities if the associated catalyst is to be used for an economic period of time. The process of the present invention, since it achieves stability at low pressure with accompanying low catalyst fouling rate, can be built without extensive regenerating facilities, such as swing bed reactors, thereby effecting great savings in initial investment.

The process of the present invention may be effected in any suitable process system familiar to those skilled in the art such as: fluidized-type process, moving bed type process, etc. A particularly suitable process comprises the well known fixed-bed system in which the catalyst is disposed in a reaction zone, and the hydrocarbons to be treated are passed therethrough in either upward or downward flow. The reaction zone effluent is generally fractionated to separate hydrogen and to recover the desired liquid products. As hereinbefore set forth, the hydrogen is typically recycled for further use in the process.

The following example is introduced to illustrate further the novelty, mode of operation, and utility of the present invention, and the benefits to be derived through the utilization thereof. It is not intended to limit unduly the present invention to the method of catalyst manufacture or to the specific conditions, reagents or concentration employed therein since these are to be regarded as illustrative rather than restrictive.

EXAMPLE

This example evidences the increase in a low pressure, reforming process stability which is characteristic of the present invention.

An alumina sol is prepared by digesting 99.99% pure aluminum metal in a dilute hydrochloric acid solution at an elevated temperature. During digestion, magnetic purification is achieved by use of magnetic dross collectors on a slip stream. A small but significant removal of iron and copper from the solution is also effected by this procedure. The purified alumina sol has about a 2 p.p.m. iron content, by chemical analysis, based on weight of alumina in the sol. The raw sol is then blended with water and hydrochloric acid solution in order to obtain a sol having an Al/Cl ratio of 1.15 and a specific gravity of 1.3450. The sol is then aged for three days.

After aging the sol is divided into three portions—A, B and C. Sufficient ferrous chloride is then added to the portions in order to achieve the following iron concentrations: 500 p.p.m. iron for portion A, 1000 p.p.m. iron for tion B, 4000 p.p.m. iron for portion C.

An aqueous solution containing hexamethylenetetramine (HMT) is then prepared. An equal portion of this HMT solution is then mixed with each of the portions of the alumina sol. The resultant solutions are then separately passed through a vibrating dropping head and dropped in discrete particles into a forming oil maintained at about 200° F. (see U.S. Patent No. 2,620,314 for additional details of this method). The dropped particles are then aged in the oil for a period of about 21 hours. The aged particles are then transferred to a 2% ammonium hydroxide solution where they are aged at about 200° F. for 3 hours. The resultant spherical particles are then water washed at about 200° F. for four hours to remove neutralization salts. The particles are finally oven dried and calcined at 1200° F. for four hours in an air atmosphere.

An impregnation solution containing chloroplatinic acid and hydrochloric acid is added to the separate vessels containing the particles resulting from the different iron-alumina sols. The resultant platinum and chloride containing composites are then dried at a temperature of 190° F. to 220° F. for the purpose of removing excessive water remaining from the impregnation solution. Thereafter, the resultant particles are oxidized, or calcined, initially at a temperature within the range of from about 400° F. to about 600° F. for a period of about an hour. The calcination temperature is subsequently increased to a level between about 900° F. to about 1000° F. and the catalytic composite is subjected to further oxidation at this temperature for about two hours. The environment containing the various catalyst is then purged with nitrogen in order to remove substantially all oxygen. Thereafter, a stream of oxygen-free and sulfur-free hydrogen is passed over the catalysts for a period of about four hours at a temperature of about 900° F. to about 1100° F. After the reduction period, the catalysts are subjected to a high temperature sulfiding treatment which involves passing a mixture of hydrogen and hydrogen sulfide, in which hydrogen sulfide is present in an amount of about 1 mole percent, at a temperature of about 1050° F. for a period of about two hours.

The quantitative results of the above procedure are given in Table I for the various catalysts of interest. It is to be noted that the catalyst type designation corresponds to the designation of the sol portions previously mentioned. Likewise, it is to be noted that Table II also contains a control catalyst—labeled D—which is made in exactly the same fashion as previously delineated except for the magnetic purification of the alumina sol step and the addition of iron chloride step. Catalyst D then is representative of high quality reforming catalyst of the prior art.

TABLE I.—COMPOSITION OF CATALYSTS

| Catalyst Type | A | B | C | D |
|---|---|---|---|---|
| P.p.m. Fe added to alumina | 500 | 1,000 | 4,000 | 0 |
| Wt. percent Pt | 0.773 | 0.834 | 0.75 | 0.75 |
| Wt. percent Cl | 0.72 | 0.96 | 0.90 | 0.90 |
| Wt. percent S | 0.18 | 0.13 | 0.10 | 0.10 |

These catalysts are then subjected to a series of identical high stress evaluation tests for the purpose of evaluating their stability characteristics.

The charge stock that is utilized in this evaluation test is a light Kuwait naphtha having a 64.0° API gravity at 60° F., an initial boiling point of 175° F., an end boiling point of 275° F., a sulfur content of 2.0 p.p.m., less than 1 p.p.m. of nitrogen, and less than 2 p.p.m. of water. Furthermore, the charge stock is approximately 71% by volume paraffins, 21% by volume naphthenes and 7% by volume aromatics.

The flow scheme that is employed in this evaluation test consists of: passing the charge stock in admixture with recycle hydrogen over the catalyst to be evaluated which is situated in a reforming zone; withdrawing from the reforming zone a single product stream; passing this effluent stream through cooling means and into a separating zone; separating a hydrogen-rich gaseous phase from a hydrocarbon liquid phase; recycling a portion of the gaseous phase through compressive means to the reaction zone; passing the liquid phase from the separating zone to a fractionating zone; removing the light ends (i.e. $C_1$ to $C_4$) from this liquid phase in this fractionating zone; and recovering a $C_5+$ reformate product stream from this fractionation zone.

The evaluation test is carried out at a liquid hourly space velocity of 1.5, a reactor pressure of 100 p.s.i.g., and a mol ratio of 12 moles of total recycle gas per mol of hydrocarbon charge. The test period is six days. And the temperature is adjusted constantly throughout the test in order to attain a reformate having an octane number of 100 F–1 clear.

A first series of identical evaluation tests are run on the catalysts shown in Table I with no halogen addition to the reforming zone. The results of this series of runs are shown in Table II in terms of temperature and yield stability.

TABLE II.—RESULTS OF HIGH STRESS STABILITY TEST WITH NO HALOGEN ADDITION

| Catalyst Type | 1st Period | | 6th Period | | Stability | |
|---|---|---|---|---|---|---|
| | Temp., °F. | $C_5+$ Yield | Temp., °F. | $C_5+$ Yield | $\Delta T$ | $\Delta C_5+$ Yield |
| A | 961 | 76.0 | 1,003 | 74.2 | +42 | −1.8 |
| B | 954 | 74.6 | 987 | 74.0 | +33 | −0.6 |
| C | 963 | 73.0 | 993 | 71.3 | +30 | −1.7 |
| D | 962 | 77.3 | 992 | 72.4 | +30 | −4.9 |

From the table it can be seen that the results are reported in terms of reactor temperature and $C_5+$ volume percent yield (referenced to a unit volume of charge) at the end of the first day of the test and at the end of the sixth day of the test. The run with catalyst D exhibits quite clearly the severe stability problem associated with low pressure reforming. As can be seen from the table the temperature stability is about 30° F. and this is coupled with a severe yield loss of about 4.9%. Runs A, B, and C manifest the beneficial effect of the iron component in their catalysts to various degrees. Nonetheless, they all show increased yield stability which is coupled with a slight initial yield loss. This yield stability is a singular characteristic of these iron-containing catalysts; but it is of marginal commercial utility at this pressure condition because it is accompanied by the same temperature instability that is characteristic of ordinary reforming catalysts of the prior art at these conditions. Accordingly, the problem is to retain this yield stability and at the same time achieve temperature stability.

Another series of runs is performed using the process of the present invention. This encompasses all of the steps and catalysts of the previous testing procedure except that 10 p.p.m. of tertiary-butyl chloride is added to the charge stock for all the runs. The results of this series of runs is shown in Table III.

TABLE III.—RESULTS OF HIGH STRESS STABILITY TEST

| Catalyst Type | 1st Period | | 6th Period | | Stability | |
|---|---|---|---|---|---|---|
| | Temp., °F. | $C_5+$ Yield | Temp., °F. | $C_5+$ Yield | $\Delta T$ | $\Delta C_5+$ Yield |
| A | 952 | 76.0 | 970 | 73.5 | +18 | −2.5 |
| B | 948 | 74.0 | 961 | 73.2 | +23 | −0.8 |
| C | 953 | 72.5 | 975 | 70.0 | +22 | −2.5 |
| D | 950 | 77.0 | 976 | 70.6 | +26 | −6.4 |

As can be seen from a comparison of Table III with Table II the effect of adding the additional halogen was quite different with respect to catalyst D than it was with respect to the iron-containing catalysts—A, B, and C. In general, the results for catalyst D were in line with the prior art teaching than an increase in the acid-function of the catalyst would promote some slight temperature stability but this would be at the expense of increased hydrocracking activity which would result in a substantial decrease in $C_5+$ volume percent yield. The confirmation of these expectations are evident from the results for catalyst D—a 4° F. temperature stability improvement coupled with a 1.5% decrease in yield. In sharp contrast with this result are the runs for the iron-containing catalysts. They manifest a surprising deviation from the teachings of the prior art in that they show a substantial increase in temperature stability not being accompanied by a significant decrease in yield stability. For example, catalyst B in the no chloride addition run shows a temperature stability of 33° F. and a yield stability −0.6, and in the chloride addition run it shows a temperature stability of 23° F. and a yield stability of −0.8. Accordingly, it is evident that an increase in the acid-function of the catalyst has not been paralleled by a sharp increase in the hydrocracking to light gases function of the catalyst. This, as previously explained, I believe is due to the selective hydrocracking function induced in the catalyst by the iron and halogen.

It is to be emphasized that the optimum amount of halogen to be added in a given case is a pronounced function of the characteristics of the particular charge stock and catalyst being used and as such it ordinarily can be determined, within the broad range previously given, by suitable experimentation familiar to those skilled in the art.

I claim as my invention:

1. A process for reforming a hydrocarbon charge stock which comprises contacting said charge stock, hydrogen, and from about 1 p.p.m. to about 25 p.p.m. by weight of the charge stock of a halogen-containing compound in a reforming zone, at reforming conditions including a pressure of from about 50 p.s.i.g. to about 200 p.s.i.g., with a catalytic composite comprising an alumina component, a halogen component, a platinum group component, a sulfur component, and an iron component, said iron component being uniformly distributed in said catalytic composite in an amout of from about 100 p.p.m. to about 5000 p.p.m. by weight of the composite.

2. The process of claim 1 further characterized in that said catalytic composite is prepared from purified alumina containing less than about 20 p.p.m. of iron by weight.

3. The process of claim 1 further characterized in that said halogen-containing compound enters the reforming zone in admixture with the hydrocarbon charge stock.

4. The process of claim 1 further characterized in that said halogen component is combined chloride and that said halogen-containing compound is a chlorine-containing compound.

5. The process of claim 1 further characterized in that said halogen-containing compound is an alkyl halide.

6. The process of claim 1 further characterized in that said platinum group component is platinum which is present in an amount of from about 0.01% to about 3.0% by weight of the composite.

7. The process of claim 1 further characterized in that said sulfur component is present in an amount of from about 0.05% to about 0.5% by weight of the composite and that said sulfur component is added after a high temperature reduction of a sulfur-free composite of alumina, iron, halogen and a platinum group metal.

8. The process of claim 1 further characterized in that said halogen component is present in an amount of from about 0.4% to about 4.0% by weight of said composite.

9. The process of claim 1 further characterized in that said reforming conditions also include a liquid hourly space velocity of from about 0.5 to about 15.0, a temperature of from about 800° F. to about 1100° F., and a mole ratio of hydrogen to charge stock of from about 0.5 to about 20.0

References Cited
UNITED STATES PATENTS

| | | | |
|---|---|---|---|
| 2,863,825 | 12/1958 | Engel | 208—139 |
| 2,898,386 | 8/1959 | Raley et al. | 208—139 |
| 2,939,847 | 6/1960 | Smith et al. | 208—139 |
| 3,143,511 | 8/1964 | Bichard et al. | 208—139 |
| 3,224,962 | 12/1965 | Baldwin | 208—139 |
| 3,248,320 | 4/1966 | White et al. | 208—139 |
| 3,253,055 | 5/1966 | Goble et al. | 208—139 |
| 3,287,253 | 11/1966 | McHenry et al. | 208—139 |

HERBERT LEVINE, *Primary Examiner.*